United States Patent

[11] 3,596,784

| [72] | Inventor | Howard G. Hanson<br>Wolverton, Minn. 56594 |
|---|---|---|
| [21] | Appl. No. | 881,697 |
| [22] | Filed | Dec. 3, 1969 |
| [45] | Patented | Aug. 3, 1971 |

[54] HAYSTACK-FORMING DEVICE
8 Claims, 11 Drawing Figs.
[52] U.S. Cl. .................................................. 214/42 A,
214/512
[51] Int. Cl. ..................................................... B65g 67/22
[50] Field of Search ........................................... 214/506,
512, 83.24, 42 A, 42 R; 280/43.11, 43.23

[56] References Cited
UNITED STATES PATENTS
3,012,682  12/1961  Williamson ................... 214/506 X
3,014,605  12/1961  Heising ......................... 214/42 A

*Primary Examiner*—Albert J. MaKay
*Attorney*—Williamson, Palmatier & Bains

ABSTRACT: A mobile-towed-type haystack-forming device, for forming chopped hay into stacks, and which includes a wheel-supported housing given rear closure means for closing the open rear end thereof. A floor structure is slidably mounted on the housing and is slidable forwardly from a closed position to an opened position to open the lower end of the housing so that when the rear closure means is also opened, chopped hay within the housing will be deposited on the ground in a stabilized stack form.

PATENTED AUG 3 1971

INVENTOR.
HOWARD G. HANSON

BY Williamson, Palmatier & Bains
ATTORNEYS

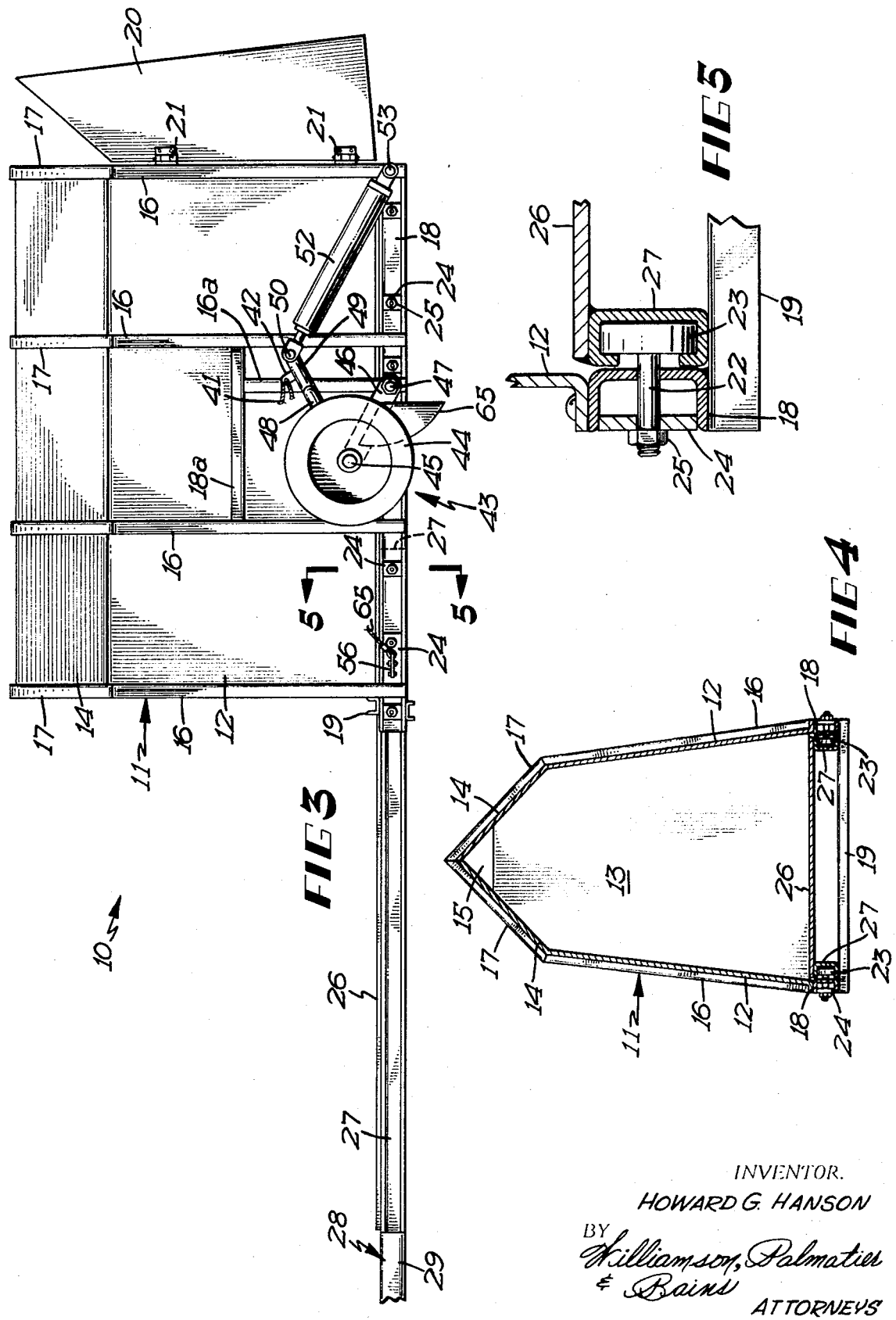

PATENTED AUG 3 1971
3,596,784
SHEET 3 OF 4
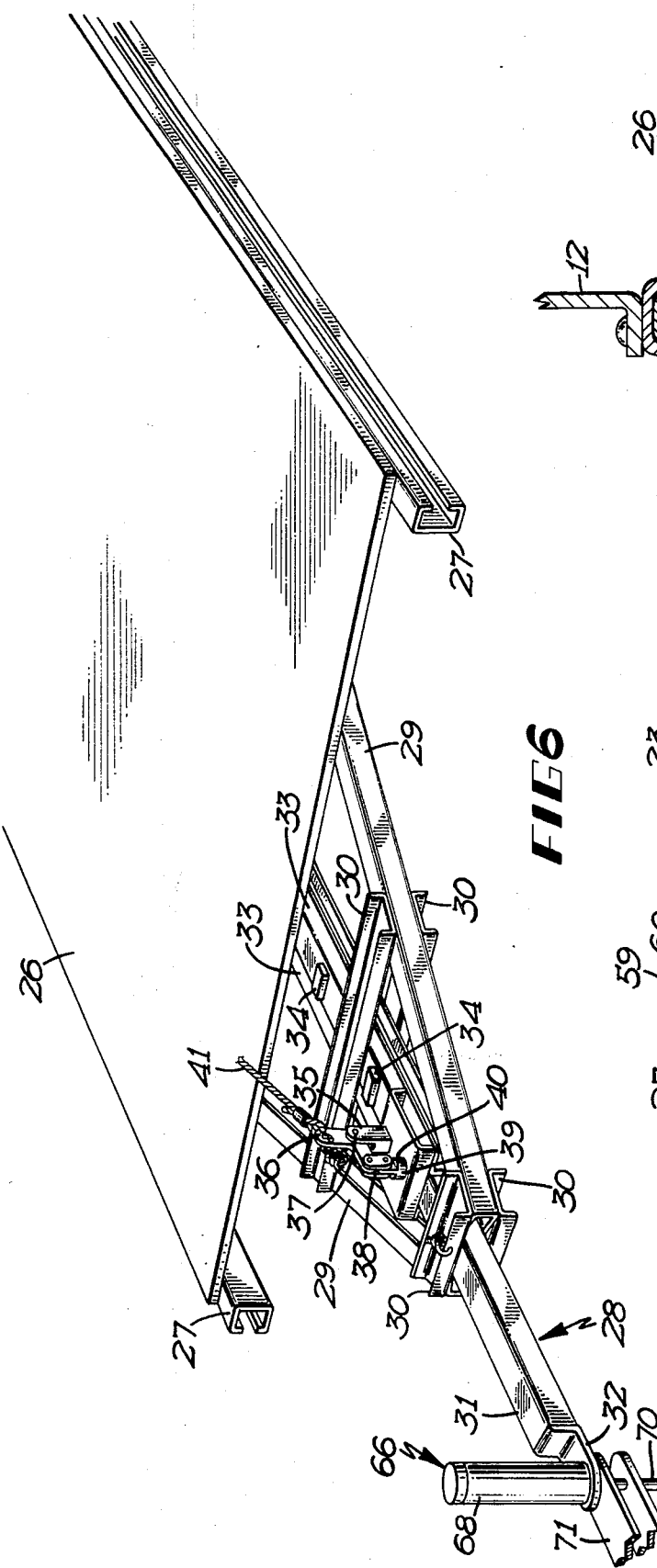
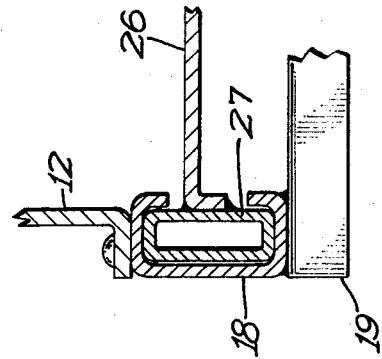
FIG 8
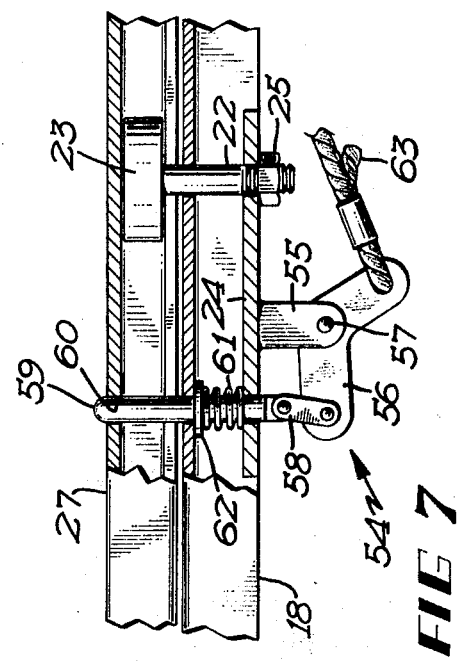
FIG 6
FIG 7
INVENTOR.
HOWARD G. HANSON
BY Williamson, Palmatier
& Bains
ATTORNEYS

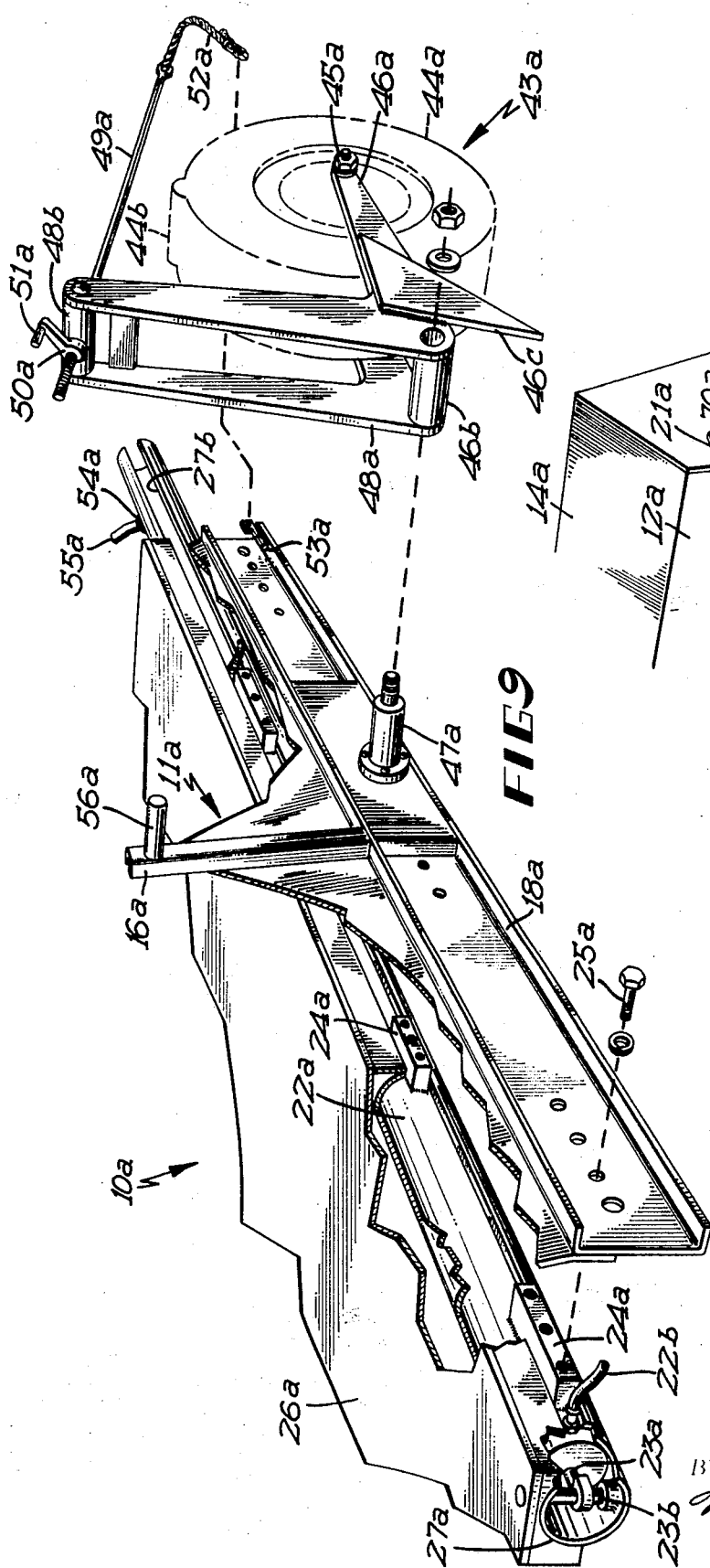
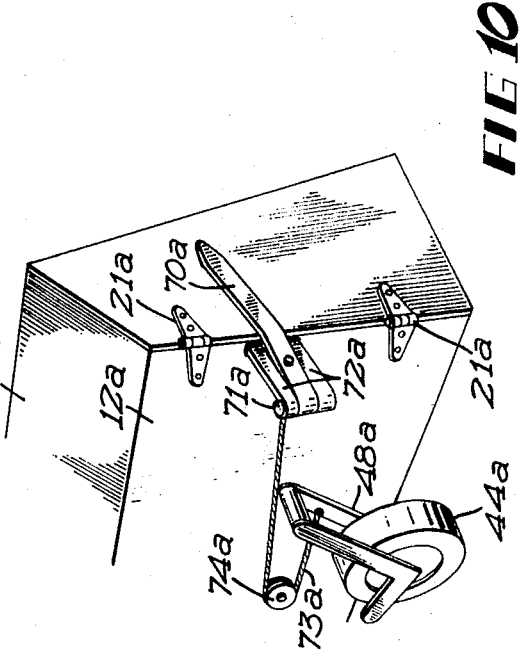
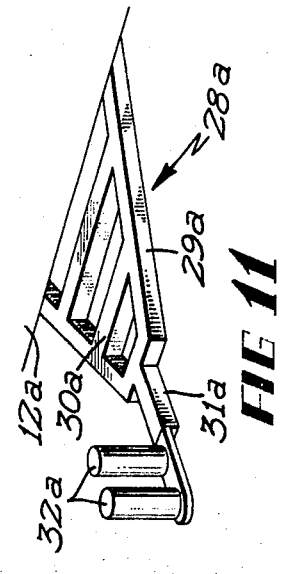

HAYSTACK-FORMING DEVICE

SUMMARY OF THE INVENTION

Although there are currently available hay baling machines and other devices for use in facilitating handling of loose hay, there are currently no mobile devices for use in effectively forming chopped hay into stack forms.

It is therefore a general object of this invention to provide a mobile haystack-forming device of simple and inexpensive construction, adapted to be connected in towed relation to a rotary chopping machine or other similar hay chopping vehicle, and which is adapted to collect a predetermined amount of hay therein, and to deposit the collected chopped hay in stack form upon the surface of the ground.

A more specific object of this invention is a provision of a haystack-forming device including a wheel-supported housing having a floor structure slidably mounted thereon for sliding movement between opened and closed positions so that upon sidling movement of the floor structure to an opened position, rear door closure means will also be opened and chopped hay within the housing will be deposited upon the ground in a stabilized stack form. The wheel means for the housing is also shiftable to elevate the housing for travel during collection of the hay and is shiftable to lower the housing closely adjacent the surface of the ground simultaneously during shifting movement of the floor structure to the opened position. This arrangement facilitates discharge of the hay as a stack from the housing and also minimizes any tendency of the haystack to crumble.

These and other objects and advantages of this invention will more fully appear from the following description made in connection with the accompanying drawings wherein like references characters refer to the same or similar parts throughout the several views.

BRIEF DESCRIPTION OF THE DRAWINGS

FIG. 3 is a side-elevational view of a haystack-forming device similar to FIG. 2 but illustrating the various components thereof during the haystack-discharging operation, FIG. 4 is a cross-sectional view taken approximately along line 4-4 of FIG. 2 and looking in the direction of the arrows, FIG. 5 is a cross-sectional view taken approximately along line 5-5 of FIG. 2 and looking in the direction of the arrows, FIG. 6 is a diagrammatic perspective view of the haystack forming device illustrating the relationship of certain components thereof, FIG. 7 is a cross-sectional view taken approximately along line 7-7 of FIG. 2 and looking in the direction of the arrows, and FIG. 8 is a cross-sectional view similar to FIG. 5 illustrating a modified form of the invention, FIG. 9 is a fragmentary perspective view of a modified form of the haystack-forming device, FIG. 10 is a perspective view, illustrating a releasable locking means for the rear closure of the embodiment of FIG. 9, and FIG. 11 is a front perspective view illustrating the hitch employed in the embodiment of FIG. 9.

DETAILED DESCRIPTION OF THE INVENTION

Figure 2:
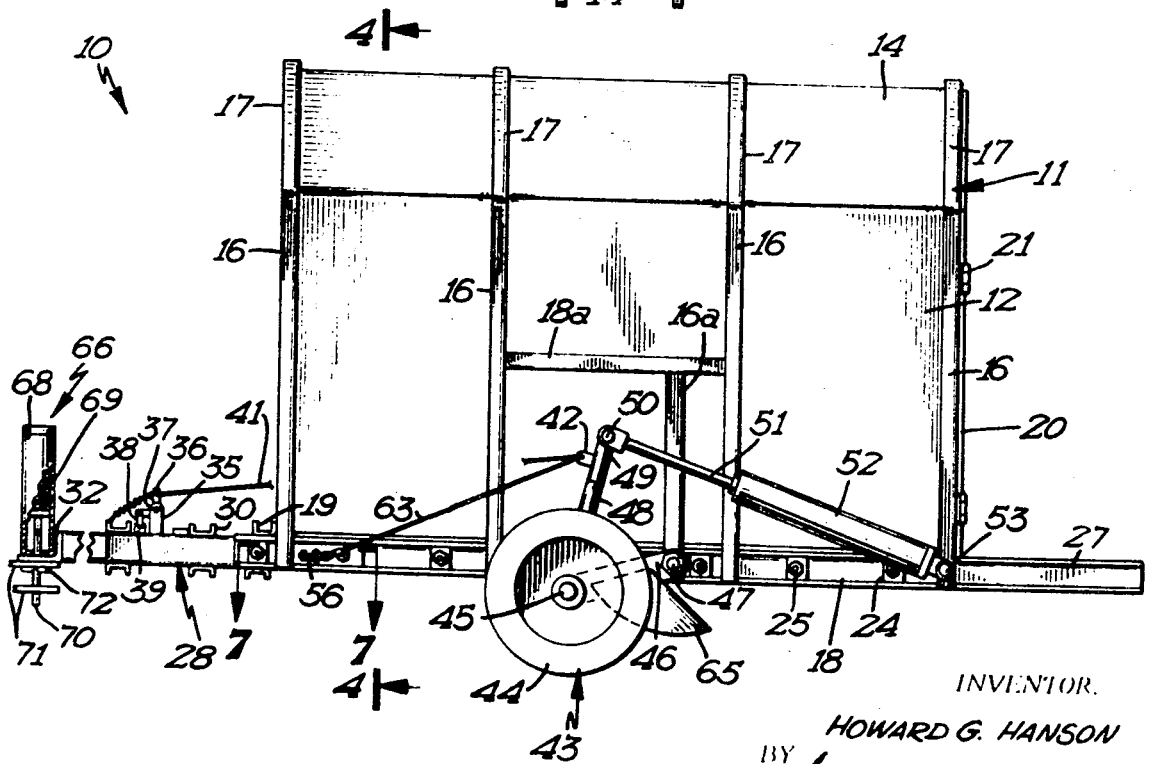
FIG. 2 is a side-elevational view of a haystack-forming device arranged for travel.

Referring now to the drawings, it will be seen that one embodiment of the novel haystack-forming device designated generally by the reference numeral 10 is thereshown. This haystack-forming device 10 is comprised of a housing 11 including upstanding sidewalls 12 which are rigidly affixed to an upstanding front wall 13. It will be noted that the sidewalls 12 as well as the front wall 13 are inclined upwardly as best seen in FIGS. 2, 3 and 4. Each sidewall has an inclined roof or top wall section integral therewith and extending upwardly and inwardly therefrom and which join each other in vertical apex or hip.

The upper portion of the front wall 13 has an inlet opening 15 therein through which the chopped hay is introduced from the forage or rotary chopper C. The housing is provided with suitable vertical frame members 16 to which are secured the sidewalls 12 and the upper end portions of these vertical frame members are secured to roof frame members 17 which are arranged in converging pairs whose inner or upper ends are rigidly joined together. The roof sections 14 are secured to the roof frame members 17, and it will be noted that the lower end portions of the vertical frame members are rigidly secured to longitudinal frame members 18 adjacent the front portion thereof as best seen in FIGS. 2 and 3.

The rear end portion of the housing is open but is closed by a pair of rear closure members or doors 20 each being hingedly connected by hinges 21 to the rearmost pair of frame members 16. It will be noted that the rear edges of the sidewalls as well as the rearmost vertical frame members 16 are inclined forwardly so that when the pair of doors 20 are in the closed position, the doors will be disposed in an upwardly and forwardly inclined position. With this arrangement, the doors will normally be urged into the closed position by action of gravity but may be swung to the opened position in response to the action of a load of hay against the inner surfaces of these doors.

Referring now to FIGS. 4 and 5, it will be seen that the longitudinal frame members are of channel shaped cross-sectional configuration and each longitudinal frame member has a plurality of longitudinally spaced-apart openings therein each accommodating the axle 22 of a roller 23. Each roller 23 is journaled on its axle and the outer end of each axle is threaded and projects through an apertured bracket 24 and is secured thereagainst by means of a nut 25. It will be noted that each of the brackets 24 are of rectangular configuration and are urged against the flanges of the associated channel-shaped longitudinal frame member 18.

The haystack-forming device 10 also includes a slidable floor structure 26 which is best seen in FIGS. 3, 4 and 5, is of substantially flat configuration and serves to close the open lower end of the housing 11 during the loading operation. However, the floor structure 26 is slidable from its closed position in a forward direction to an opened position to allow the hay which is somewhat compacted within the housing to be deposited upon the surface of the ground. It will be seen that the floor structure 26 is provided with a pair of elongate tracks 27 which are affixed to the lower surface thereof adjacent the longitudinal edges thereof. The tracks 27 are supported on the rollers 23 to permit sliding movement of the floor relative to the housing 11.

The floor structure 26 has a hitch frame 28 rigidly secured thereto and projecting forwardly therefrom. The hitch frame 28 includes a pair of elongate longitudinal frame elements 29 each being secured at its rearmost end to the front end of the floor structure 26. These longitudinal frame elements converge towards each other and are rigidly affixed in spaced-apart relation by transverse frame elements 30. The hitch frame 28 includes an elongate longitudinally extending tongue 31 which is provided at its forwardmost end with a suitable coupling element 32 for connection to the rotary chopper implement C to permit articulation therebetween.

Referring now to FIG. 2 it will be noted that the rear portion of the longitudinally extending tongue 31 is telescopically and slidably received within a tongue receiving member 33 which is of hollow tubular construction. This tongue receiving member 33 is rigidly affixed to the transverse frame elements 30 and extends longitudinally of hitch frame 28. Therefore the tongue 31 is connected to hitch frame 28 for limited longitudinal movement relative thereto.

In this regard, it will be noted that the tongue 31 has a transverse stop element 34 rigidly affixed to the upper surface thereof and being movable therewith between adjacent of the transverse frame elements 30. Thus the limit of longitudinal movement of the tongue 31 relative to the hitch frame 28 is defined by the travel of the transverse stop element between the adjacent transverse frame elements.

Means are also provided for releasably locking the tongue 31 against longitudinal movement and this means comprises a releasable lock element on the tongue-receiving member which engages the tongue 31 to lock the tongue to the hitch frame.

The locking means includes a bracket 35 which is mounted on the tongue receiving member 33 and which is an L-shaped crank 36 pivotally mounted thereon by pivot 37. One arm of the crank or lever 36 is pivotally connected to the link 38 which is pivotally connected at its other end to a spring urged locking pin 39. The locking pin is movable into and out of an opening in the tongue 31. Since the locking pin is spring urged, the locking pin will normally be urged to the locked position when the pin is positioned in the opening 40.

The other leg of the locking crank or lever 36 is connected to one end of a rope or cable 41 and the other end of the cable is connected to a bracket 42 which is secured to one of a pair of similar wheel assemblies 43. Each of the wheel assemblies is comprised of a pair of tire-mounted ground engaging wheels 44 mounted on stub axle 45. The stub axle 45 is secured to one end of an arm 46 which is pivotally secured at its other end by pivot 47 through the housing 11. In the embodiment shown, the pivot 47 for each wheel is actually secured to a relatively short vertically frame member 16a which in turn is rigidly secured to a longitudinal frame element 18a which also is of abbreviated length and extending between and integral with a pair of the full-size vertical frame elements 16.

The stub axle 45 of each wheel assembly 43 is connected to a U-shaped member 48, the latter projecting outwardly and upwardly from the associated stub axle 45 and having an attachment arm 49 projecting from the bight portion thereof. The attachment arm 49 for each wheel assembly 43 is pivotally connected by pivot 50 to the piston rod 51 of the hydraulic ram 52. It will be noted that each hydraulic ram 52 is pivotally connected by a pivot 53 to one side of the housing 11 adjacent the lower rear end portion thereof. Extension and retraction of the piston rod 51 shifts the wheel assembly between a lowered position as best seen in FIG. 2 wherein the housing 11 is elevated for travel, and an elevated position as best seen in FIG. 3 wherein the housing is lowered for discharge of the hay is stacked form therefrom. The hydraulic rams may be of the single acting type and will be supplied with hydraulic fluid reservoir on the tractor teeth. The controls for operating the hydraulic rams will also be located on the tractor teeth.

It will be noted that when the wheel assemblies 43 are shifted from their lowered position as shown in FIG. 2 to the elevated position in FIG. 3, the locking pin 39 will be unlocked from locked relation with respect to the tongue 31. This permits the tongue to shift relative to the tongue receiving member a short distance until the stop element 34 strikes one of the transverse frame elements 30 with a jarring effect. This jerking or jarring effect is desirable in order to facilitate movement of the slidable floor structure relative to the housing 11, especially since the floor structure will be supporting a relatively heavy load of hay thereon.

Means are also provided for releasably locking the slidable floor in a locked position with the housing 11 and this means includes a pair of locking mechanisms 54 located at opposite sides of the housing adjacent the lower front end thereof. In the embodiment shown, each longitudinal frame members 18 of the housing has one of the locking mechanisms 64 mounted thereon adjacent the front end portion thereof.

Referring now to FIG. 7, it will be seen that each locking mechanism 54 includes a bracket 55 which is secured to the associated longitudinal frame member adjacent the front end portion thereof and which projects outwardly therefrom. An L-shaped lever or arm 56 is pivotally connected to each bracket 55 by means of a pivot 57 to permit swinging movement of the arm about a substantially vertical axis. A link 58 is pivotally connected to the outer end of one of the arms of the L-shaped lever 56 and the other end of the link 58 is pivotally connected to one end of an elongate locking pin 59 which projects through openings formed in the longitudinal frame element 18 and is insertable into an locking pin 60 in the associated track 27. It will be noted that the opening 60 is in the web portion of the track 27 so that when the locking pin 59 projects therethrough, the housing is locked to the slidable floor structure.

A spring 69 is positioned around the locking pin 59 and engages a collar 62 on the pin to normally urge the locking pin to the locked position with respect to the floor structure. In this regard, it will be noted the spring 61 also bears against the longitudinal frame member 18 so that when the locking pin 59 is retracted from locked relation with respect to the opening in the track 27, this retracted movement will be against the bias of the spring 61.

The other arm of the L-shaped lever 56 is connected to one end of an elongate rope or cable 63 and the other end portion of this cable is connected by a bracket 64 which is also mounted on the attachment arm 49 of each U-shaped member 48. Since the wheel assemblies are shiftable in unison, it will be seen that movement of the wheel assemblies from the lowered position to the elevated position simultaneously unlock each locking mechanism 54 as well as unlocking the locking pin 39 with respect to the tongue 31.

The housing 11 is also provided with a pair of downwardly projecting tines or anchoring members 65 which are affixed to arm 46 and project downwardly therefrom. These anchoring members 65 are of a length to be positioned above the surface of the ground when the wheel assemblies are in the lowered position as best seen in FIG. 2, but when the wheel assemblies are raised to lower the housing, these anchoring members will penetrate the surface of the ground to produce an anchoring effect with respect to the housing relative to the floor structure.

Figure 1:
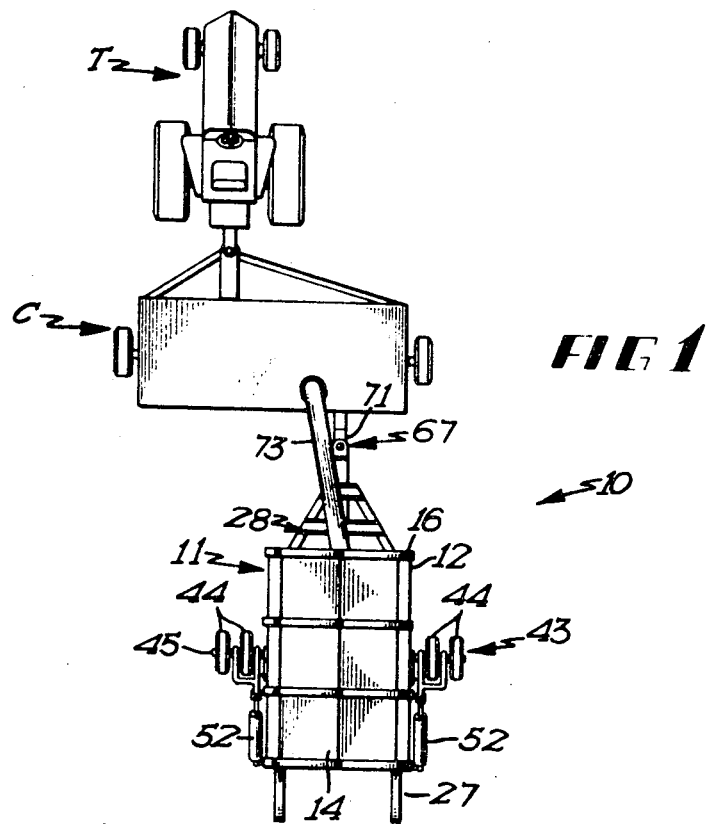
FIG. 1 is a top plan view of the novel haystack-forming device illustrated in towed relation with respect to a rotary chopper machine in turn is towed by a tractor.

It will be noted that the coupling element 32 which is affixed to the hitch frame 28 comprises a clevis and a spring urge releasable locking mechanism locks the clevis to the hitch member 67 which is secured to the frame of the rotary chopper C and projects rearwardly therefrom as best seen in FIG. 1. This locking mechanism 66 comprises a sleeve 68 which is vertically oriented and which is positioned upon the coupling element 32 to project upwardly therefrom.

A helical compression spring 69 is positioned within the sleeve 68 and is connected to a downwardly projecting locking pin 70 which projects through the opening in the coupling element 32 and through registering openings in the hitch elements 71 of the hitch member 67. These hitch elements 71 actually constitute spaced apart substantially parallel plates which are of conventional construction. The locking pin 70 has an opening therein for receiving a retaining pin 72 therethrough.

It will be noted that the retaining pin is disposed between the hitch elements or plates 71 and when the locking pin 70 is so locked with respect to these hitch elements the compression 69 is under tension and tends to urge the locking pin 70 upwardly as viewed in FIG. 2. With this arrangement the hitch connection between the haystack-forming device 10 and the rotary chopper implement C permits articulation therebetween about a substantially vertical axis and permits limited yielding movement at the point of connection about a transverse axis. The locking mechanism 66 provides a ready releasable but positive locking means between the two implements and merely requires the removal of the retaining pin 72 to disconnect the implements from each other.

During use, the tractor T or other prime mover will be used to tow the implements during the haystack-forming operation and the finely chopped hay will be discharged through a discharge conduit 73 of the rotary chopper implement C. It is pointed out that the finely chopped hay is moved through the conduit 73 be being entrained in a stream of air so that the chopped hay will be discharged through the inlet opening 15 of the housing 11. The wheel assemblies 43 will be in the lowered position as illustrated in FIG. 2 so that the housing 11 is elevated and the floor structure is locked thereto in the closed position. The doors or rear closure members 20 will also be in the closed condition. The chopped hay will be discharged into the housing 11 until the housing is filled to the desired level.

The operator seated on the tractor will then actuate a suitable valve control to retract the piston rods 51 of the hydraulic rams 52. Although the hydraulic rams may be double acting, it is preferred that each hydraulic ram may be a single-acting unit since the weight of the filled housing will be sufficient to cause the piston rod to retract from the position illustrated in FIG. 2 to the position illustrated in FIG. 3. When the wheel assemblies are shifted to the position illustrated in FIG. 3, the housing 11 will be unlocked with respect to the floor structure 26 and the tongue 31 will be simultaneously unlocked from the hitch frame 28. The housing will be shifted downwardly and the anchor members 65 will penetrate the surface of the ground. Simultaneously during this action, the tongue 31 will be shifted forwardly relative to the tongue-receiving member since the tractor T will continue in its forward movement. As the transverse stop element 34 strikes the forwardmost transverse frame element 30 of the hitch frame 28, the hitch frame and the floor structure which is connected thereto will be moved forwardly in a jerking action. This jerking action of the floor structure facilitates forward movement of the floor structure from the closed position to the open position.

Since the tractor T is continuing in its forward movement, the floor structure will be moved forwardly allowing the formed haystack to be discharged upon the surface of the ground. Wheel assemblies may then be raised and the entire housing pulled forwardly whereby the rear closure members will be opened by the action of the haystack thereagainst and the housing will be moved forwardly of the formed haystack.

The operator merely needs to lower wheels again and reverse the direction of travel of the tractor to move the floor structure rearwardly to the closed position. As this occurs, the locking mechanisms 54 will be locked and the locking pin 39 will be interlocked with the tongue 31. The wheel assemblies may be lowered to elevate the housing and forward movement of the housing will cause the closure members 20 to be again swung to the closed position thereby permitting the filling operation to begin anew.

Referring now to FIGS. 9 and 10, it will be seen that a slightly different embodiment of the novel haystack-forming device is thereshown. This modified haystack-forming device, designated generally by the numeral 10a, although only partially shown is comprised of a housing 11a similar in configuration and construction to the housing of the embodiment of FIGS. 1 through 8. The housing includes upstanding sidewalls 12a which are rigidly affixed to an upstanding front wall (not shown). In this regard, it will be noted that the embodiment illustrated in FIGS. 9 through 11 is only fragmentarily illustrated. Each sidewall has an inclined roof or top wall section 14a integrally formed therewith and extending upwardly and inwardly therefrom and which join each other in an apex or hip in the manner of the embodiment of FIG. 1.

The sidewalls, front walls and rear closure members or doors 20a are all inclined inwardly and upwardly and the front wall has an inlet opening therein in the upper portion thereof. Although not completely shown in the drawings the housing 11a is also provided with a frame similar to the frame of the embodiment of FIG. 1. The frame serves to reinforce the front and sidewalls of the housing even though these walls are formed of a rigid material, such as sheet metal or the like. The frame includes vertical frame members 16a which are secured to the sidewalls and which are rigidly connected with roof frame members. The lower ends of the vertical frame members are rigidly secured to longitudinal frame members 18a which in the embodiment shown are of channel shaped cross-sectional configuration. The rear closure members or doors 20a are each hingedly connnected by hinges 21a to the sidewalls of the housing 11a.

The haystack-forming device 10a also includes a slidable floor structure 26a which is of substantially flat configuration and which serves to close the open lower end of the housing during the loading operation. The floor structure 26a is slidable between open and closed positions to allow the hay within the housing to be deposited upon the surface of the ground in stack form. The floor structure 26a is provided with a pair of elongate generally tubular slide members 27a each having a slot 27b therein throughout the length thereof. It will be noted that the slot 27b opens outwardly and each of these tubes has a double-acting hydraulic ram therein, each ram including a cylinder 22a having a piston movable therein which is connected to a piston rod 23a. The piston rod 23a is connected at its front end to a pin 23b which is rigidly secured to slide member 27a. The piston 22a is connected to suitable conduits 22b which in turn are connected to a source of hydraulic pressure on the tractor which tows the rotary chopper and the haystack forming device 10a.

Each cylinder 22a is provided with a plurality of mounting blocks 24a which project through the slot 27b in the associated slide member 27a and engage the longitudinal frame member 18a and are secured thereto by suitable bolt assemblies 25a. Thus it will be seen that by extending the piston rod 23a, the floor structure 26a will be shifted forwardly from the closed position to the open position.

When the piston 23a is retracted, the floor will be returned to the closed position. Therefore, shifting movement of the floor structure 26a is by hydraulic power rather than the inertial arrangement of the embodiment of FIG. 1.

The floor structure 26a also has a hitch frame 28a which includes a pair of longitudinal frame elements 29a which are rigidly secured at their rearmost ends to the front end of the floor structure 26a and which converge towards each other in a forward direction. These longitudinal frame elements are interconnected by transverse frame elements 30a and a longitudinally extending tongue 31a projects forwardly of the itch frame and is provided with a pair of spring urged coupling mechanisms 32a as best seen in FIG. 11. Thus it will be noted that the hitch frame 28a does not include a tongue which is slidably shiftable relative thereto in the manner of the embodiment of FIG. 1.

A pair of similar wheel assemblies 43a are provided, each wheel assembly including a pair of tire-mounted ground-engaging wheels 44a. Each wheel is mounted on a stub axle 45a which is secured to one end of an arm 46a which in turn is pivotally secured at its other end by pivot 47a to the longitudinal frame elements 18a of the housing 11a. It will be noted that the arm 46a has an arm 48a connnected thereto and projecting upwardly therefrom. It will be noted that the arm 46a as well as the arm 48a is comprised of a pair of arm elements positioned on opposite sides of the wheel and interconnected by suitable spacers 46b and 48b respectively. The arm 46a of each wheel assembly also has a pointed ground engaging anchor member 46c thereto and projecting downwardly therefrom. The ground engaging retaining member is adapted to penetrate the surface of the ground when the wheel assemblies are shifted to their elevated position to lower the housing 11a.

Each wheel assembly is provided with an elongate rod or arm 49a which is of rigid construction and which projects through an opening in the spacer member 48b. One end of the rod 49a is threaded and threadedly engages a revolvable nut 50a which is revolvably mounted on the spacer 48b and which is provided with a handle 51a to facilitate revolving movement thereof. The other end portion of the arm or rod 49a is connected to one end of a cable 52a and the other end of the cable is secured by cable anchor element 53a affixed to the rear end portion of the longitudinal frame member 18a. It will be noted that the cable 52a of each wheel assembly is anchored to the inner surface of the longitudinal frame element 18a and is trained about a pulley 54a which is journaled on the inner surface of the adjacent guide member 27a. The pulley is provided with an upwardly and inwardly projecting guide 55which extends upwardly from the pin or axle thereof. Thus it will be seen that when the slide member 27a is shifted either in a forward or adverse direction, the associated cable will be tensioned so that each wheel assembly will be raised and lowered. Thus raising and lowering of the wheel assemblies is in response to extension and retraction of the piston rods 23a of the hydraulic rams.

Means are also provided for releasably locking the rear closure members or doors 20a in the closed condition but which is operable to release the doors in response to shifting movement of the wheel assemblies. This means includes an elongate locking strap 70a for each closure member 20a which is swingably mounted on a vertical pin 71a which is carried by a pair of brackets 72a. It will be noted that the brackets 72a each have their inner end secured to the rear marginal edge portion of the adjacent sidewall 12a intermediate the ends thereof and project outwardly therefrom. Thus the strap 70a is swingable relative to the brackets between released and locked positions.

Means are provided for urging the strap 70a for each closure member to the locked or retaining position and this means includes an elongate cable 73a which has one end thereof secured to the strap intermediate the ends thereof at a point located between the bracket 72a. The cable is trained about a pulley 74a which is mounted on the sidewall of the housing and the cable 73a is anchored on the upper end portion of the arm 48a of the adjacent wheel assembly. It is pointed out that a similar locking arrangement is provided for the other closure member although not shown in the drawing. It will therefore be seen that when the arm 48a will be relaxed so that the locking strap for each closure member may be swung rearwardly. Thus when pressure is applied against the rear closure members by the stack of hay, the closure members will open. However, when the wheel assemblies are lowered to raise the housing, the cable 73 will be tensioned and will engage the closure members and urge the same to the closed positions. Thus it will be seen that the closure members are also swingable between opened and closed positions in response to extension and retraction of the hydraulic rams.

The operation of the embodiment of FIGS. 9 through 11 is similar to the embodiment of FIGS. 1 and the description will therefore be only briefly described. The housing 11a will be filled with the chopped hay while the floor structure 26a is in the closed position. It will be noted that when the floor structure 26a is in the closed condition, the piston rod 23a for each hydraulic ram will be in the retracted position. The wheel assemblies 43a will also be in the lowered position so that the housing will be elevated.

It will be noted teat each tire mounted wheel 44a is provided with an outwardly projecting or offset element 44b which is secured thereto and projects outwardly therefrom. This arrangement produces a vibrating action during travel of haystack forming device so that the chopped hay will be compacted within the housing 11a during collection of the hay. When the housing is filled housing the desired degree, the operator located on the tractor will actuate a valve control to extend the hydraulic rams and to shift the floor structure 26a forwardly.

When this occurs, the wheel assemblies 44a will be raised so the housing is lowered. Again, it is pointed out that the wheel assemblies will still be disposed in supporting relation with respect to the housing even when the housing is in its lowermost position. The precise amount of movement of the wheel assemblies between elevated and retracted positions may be controlled by adjustment of the rod 49a. When the wheel assemblies are lowered the anchor member 46c will penetrate the surface of the ground and thus limit further rearward movement of the wheel assemblies and the housing supported thereby. Thus the hay within the housing will be deposited upon the surface of the ground since the floor structure will have been shifted to its forwardmost position. Movement of the wheel assemblies also releasably unlocks the closure member so that when the wheel assemblies are again lowered to raise the housing, the cable 73a will be relaxed thus allowing the closure members 20a to swing to their opened position. A stop member 56a is secured to each vertical frame member 16a of the housing frame to limit forward movement of the arm 48a of each wheel assembly. The floor structure 26a may be power shifted to its closed position by retracting the piston rods 23a.

It is pointed out that the floor structure in both embodiments has a beveled or sharpened rear edge. With this arrangement the stacks of hay may be reloaded into the housing by moving the floor structure rearwardly while the housing is in the lowered position. The rear doors or closures will be opened during the stack reloading operation and will be closed when the stack is loaded. It will therefore, be seen that the stack forming device may be sued to very effectively load the formed stacks and to transport the stacks to desired locations.

From the foregoing description, it will be seen that the haystack-forming device permits the formation of relatively fine chopped hay into haystacks which are dimensionally stable. The novel haystack device is also arranged and constructed to permit a single operator to operate the haystack-forming device through a filling and discharge cycle without being required to leave the tractor. It will be appreciated that several such haystacks may be formed and thereafter collected in any conventional manner.

The slanted construction of the sides of the housing as well as the slanted arrangement of the rear closure members not only produces a compacting effect on the chopped hay as it is introduced into the housing but also imparts to the formed stack a geometrical configuration which minimizes any tendency of the haystack to collapse. Thus, relatively large haystacks may be formed through the use of my novel haystack-forming device.

Thus it will be seen that I have provided a novel and improved haystack-forming device, which is not only of simple and inexpensive construction, but one which functions in a more efficient manner than any heretofore known comparable device.

It will, of course, be understood that various changes may be made in the form, details, arrangement and proportions of the various parts without departing from the scope of my invention.

What I claim is:

1. A tow-type haystack-forming device comprising
    a housing including upstanding sidewalls, a front wall fixedly connected to said sidewalls, and a top wall secured to said front and sidewalls, said housing having an open rear end and an open lower end,
    closure means for closing said open rear end, a pair of ground-engaging wheel means positioned on opposite sides of said housing and being interconnected thereto for shifting movement between raised and lowered positions,
    means connected with said ground-engaging wheel means for shifting the same between lowered and elevated positions,
    a floor structure, means on said floor structure and housing respectively slidably mounting said floor structure between open and closed positions, said floor structure when in the closed position closing the lower open end of the housing and being slidable forwardly to the open position to completely open the entire lower end of said housing, and
    hitch means secured to the front end portion of said floor structure and being connectable to a towed-type hay-chopping machine whereby hay cut by the chopping machine will be discharged into the housing.

2. The haystack-forming device as defined in claim 1 and means on said floor structure and housing for releasably locking said floor structure to the housing in the closed position, means for unlocking said releasable locking means during raising of the wheel means to simultaneously cause lowering of the housing and forward movement of the floor structure relative to the housing whereby the hay within the housing will be discharged from the surface of the ground in a stable stack form, and forward movement of the housing will cause said closure means to be opened.

3. The haystack-forming device as defined in claim 2 wherein said means for unlocking said releasable lock means is connected with said wheel means and is operable during raising of said wheels to unlock said releasable locking means.

4. The haystack-forming device as defined in claim 1 wherein said sidewalls, front wall and closure means are of generally flat configuration and are inclined upwardly and inwardly.

5. The haystack-forming device as defined in claim 1 wherein said means mounting said floor structure on said housing comprises a plurality of rollers on said housing and track means on said floor structure.

6. The haystack-forming device as defined in claim 1 wherein said hitch means includes a hitch frame, a tongue mounted on said hitch frame for limited longitudinal movement relative thereto, means for releasably locking said tongue against movement relative to said hitch frame, and means for unlocking said last-mentioned lock means whereby said tongue may be moved forward relative to said hitch frame simultaneously during elevating movement of the wheel means to thereby impart a jarring impact on the floor structure to facilitate movement of the floor structure to the opened position.

7. The haystack-forming device as defined in claim 1 wherein said means for shifting said ground-engaging wheel means comprises hydraulic rams mounted on said housing and connected to said ground-engaging wheel means.

8. The invention as defined in claim 1 wherein said means mounting said floor structure on said housing includes a hydraulic ram which is extensible and retractable to power shift said floor structure between open and closed positions.

UNITED STATES PATENT OFFICE
CERTIFICATE OF CORRECTION

Patent No. 3,596,784        Dated August 3, 1971

Inventor(s) Howard G. Hanson

It is certified that error appears in the above-identified patent and that said Letters Patent are hereby corrected as shown below:

Column 8, line 15, after "structure" insert -- on said housing for fore and aft movement of the floor structure --.

Signed and sealed this 25th day of July 1972.

(SEAL)
Attest:

EDWARD M. FLETCHER, JR.        ROBERT GOTTSCHALK
Attesting Officer        Commissioner of Patents